US006862612B1

(12) United States Patent
Horn et al.

(10) Patent No.: US 6,862,612 B1
(45) Date of Patent: Mar. 1, 2005

(54) MULTIPLE 'EXPRESS BUY' PROFILES FOR MULTIPLE STORES (DELL.COM AND GIGABUYS.COM)

(75) Inventors: Michael R. Horn, Austin, TX (US); John W. Brownlee, Jr., Austin, TX (US); Marc C. Silverstein, Haverton, PA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/459,229

(22) Filed: Dec. 10, 1999

(51) Int. Cl.[7] .......................... G06F 15/16; G06F 17/60; G06F 7/00; G06F 17/00
(52) U.S. Cl. ...................... 709/219; 709/203; 709/227; 705/26; 707/103 R
(58) Field of Search ................................ 709/213–219, 709/203; 705/26, 10, 7, 27; 707/103 R, 103 Y, 103 Z

(56) References Cited

U.S. PATENT DOCUMENTS

| | | | | |
|---|---|---|---|---|
| 5,715,314 A | | 2/1998 | Payne et al. ................. | 380/24 |
| 5,715,399 A | * | 2/1998 | Bezos ........................ | 705/27 |
| 5,727,163 A | * | 3/1998 | Bezos ........................ | 705/39 |
| 5,745,681 A | | 4/1998 | Levine et al. ............ | 395/200.3 |
| 5,890,137 A | | 3/1999 | Koreeda ...................... | 705/26 |
| 5,897,622 A | | 4/1999 | Blinn et al. .................. | 705/26 |
| 5,905,973 A | | 5/1999 | Yonezawa et al. ........... | 705/27 |
| 5,960,411 A | * | 9/1999 | Hartman et al. .............. | 705/26 |
| 5,991,739 A | | 11/1999 | Cupps et al. ................. | 705/26 |
| 6,005,939 A | * | 12/1999 | Fortenberry et al. ......... | 705/64 |
| 6,092,053 A | * | 7/2000 | Boesch et al. ................ | 705/10 |
| 6,101,486 A | * | 8/2000 | Roberts et al. ............... | 705/14 |
| 6,170,017 B1 | * | 1/2001 | Dias et al. ................... | 709/226 |
| 6,330,550 B1 | * | 12/2001 | Brisebois et al. ............. | 705/26 |
| 6,356,905 B1 | * | 3/2002 | Gershman et al. .......... | 709/203 |
| 6,374,259 B1 | * | 4/2002 | Celik ........................... | 707/10 |
| 6,496,855 B1 | * | 12/2002 | Hunt et al. .................. | 709/217 |
| 6,587,880 B1 | * | 7/2003 | Saigo et al. ................ | 709/225 |

OTHER PUBLICATIONS

Iyengar, A.; Dias, D. Distributed Computing Systems, 1998. Proceedings. 18th International Conference on, May 26–29, 1998 ☐☐Pages(s): 58–65.*

"MicroSoft Passport"; © 1999 Microsoft Corporation; Internet addresses: http://www.passport.com/; http://www.passport.com/directory/default.asp; http://memberservices.passport.com/?id=3; http://memberservices.passport.com/HELP/MSRV_HELP_whatis.ASP; http://memberservices.passport.com/HELP/MSRV_HELP_whatiswallet.ASP; http://passport.com/intl/EN/default.asp?_lang=EN&_lang=EN; Printed Oct. 26, 1999.

* cited by examiner

Primary Examiner—Glenton B. Burgess
Assistant Examiner—Anita Choudhary
(74) Attorney, Agent, or Firm—Hamilton & Terrile, LLP; Stephen A. Terrile

(57) ABSTRACT

One or more sets of purchaser-specific information are saved at a central location for later retrieval and use by a plurality of server systems. Customer profile information is received from a client system during a first Internet session and saved in a customer data bank. A transaction request received from the same client system during a subsequent Internet session may be processed by a different server system than the server system that received the customer profile information. A plurality of web sites can access customer profile information that is stored in a central location, relieving the customer of the need to re-enter customer profile information during subsequent transactions with any of a plurality of server systems.

6 Claims, 17 Drawing Sheets

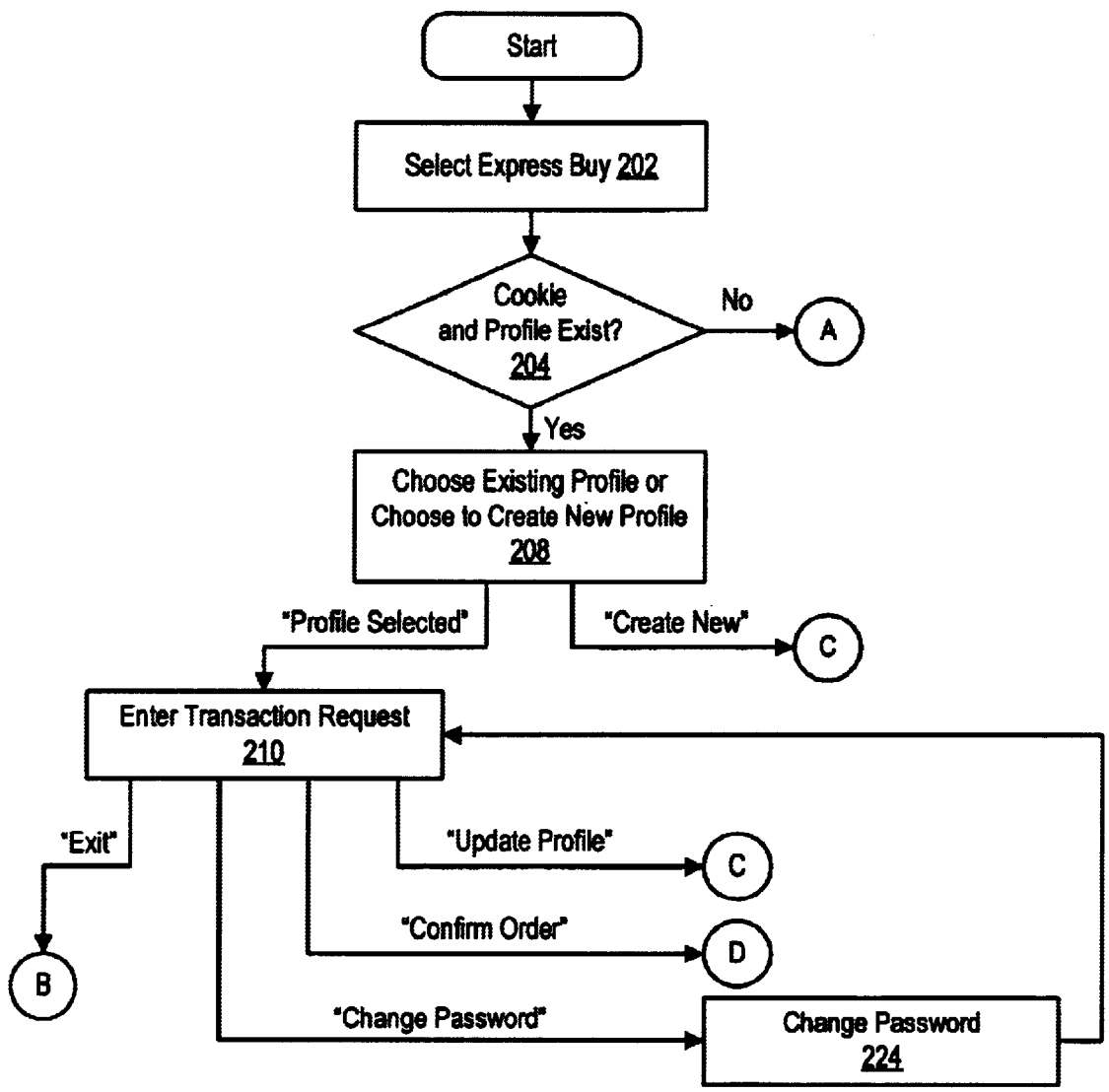
Figure 2A
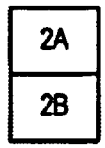

Checkout Page - Shopping Cart Page Where Users Can Click Regular Checkout or Express Buy.

Express Buy Service - Welcome to Express Buy Service from Gigabuys.
How to Sign Up - To sign up, click the "create profile" button below and follow the registration process as described below. When you complete all three steps, you can begin using the express buy service. If you would not like to set up a profile at this time, click the "your cart" button to return to your cart.
Step 1-Complete the shipment information form-Simply fill out the form, review your information for accuracy, and click the continue button. Step 2-Complete the shipping method and credit card form-Simply fill out the form, review your information for accuracy, and click the continue button. Step 3-create your password-Enter a password of your choice twice in the form, and then click continue.
When using the express buy service, you will be given the opportunity to confirm that the information supplies is correct each time you make a purchase. Also, the last four digits of your credit card will be required each time you make a purchase for your security. At the end of the checkout process, you will be able to make any changes to your profile.
The information provided will be kept confidential and used only to support your customer relationship with Gigabuys and Dell. Please see our privacy policy for more details. If other people use this machine, you may want to consider whether express buy is appropriate for this machine.

*Figure 6*

Express1 ship.asp - Shopping Cart page where users can click regular checkout or express buy

| Be Direct Dell Home | 90 Products | Buy@Dell Store | Support | Site Map | Search | Contact | Buy Online or Call: 1-800-WWW-DELL |
|---|---|---|---|---|---|---|---|

Dell Member Services - Express Buy Wizard
Step 1  Step 2  Step 3
*=required fields
Shipment Information Where do you want your order shipped?

- Title*: [Mr. ▼]
- Name (First, MI, Last)*: [Mike] [ ] [Horn]
- Street Address*: [9801 West Parmer Lane #221]
- City*: [Austin]
- State*: [Texas ▼]
- Zip/Postal Code: [78717]  Zip+4: [ ]
- Phone*: [(512)] [723-2495]
- Email address*: [mike_horn@dell.com]
- ☑ My shipping and billing address are the same Ownership Information Who will own the items ordered?
- ● I will - the bill should reflect that I am responsible for submitting payment
- ○ My organization will - please bill the business or organization listed below:

Company/Organization: [Required if an organizational purchase]

[Continue]

▷ Dell's Online Privacy Policy
▷ What's a Cookie?
▷ Find My Profile?
▷ Change My Password?

Done                                                                 Local Intranet

*Figure 7*

Express1b.asp - Page for billing information

| File | Edit | View | Favorites | Tools | Help |

Back | Forward | Stop | Refresh | Home | Buy@Dell | Products | Favorites | Search | Site Map | History | Mail | Print | Ticker Be Direct | Dell Home | Products | Store | Support | Site Map | Search | Contact Buy Online or Call:
1-800-WWW-DELL ➤ Dell's Online Privacy Policy
➤ What's a Cookie?
➤ Find My Profile?
➤ Change My Password?

Dell Member Services - Express Buy Wizard
Step 1  Step 2  Step 3  *=required fields
Your order will be billed to:
Company/Organization*: [Mr.]
Name (First, MI, Last)*: [Mike] [Hom]
Street Address*: [9801 West Parmer Lane #221]
City*: [Austin]
State*: [Texas ▼]
Zip/Postal Code: [78717] Zip+4 [    ]
Phone Number*: [(512)] [723-2495]

Tax Status [Treat order as taxable ▼]
(Tax exempt status requires a tax certificate to be on file with Dell; if not on file, the order will be treated as taxable.)

Internal Billing Reference:
[        ]
(Enter any internal ID, such as a cost center, you want to show on your online purchase order)

Purchasing Agent Information
Name (First, MI, Last)* [    ] [  ] [     ]
Phone Number* [    ] [    ]
Email address* [            ]

Type of business or organization*
○ Large Business (>3500 total employees)
○ Mid-Size Business (400-3500 total employees)
○ Small Business (>400 total employees)
○ Federal Government Agency or Organization
○ State or Local Government Agency or Organization
○ Higher Educational Institution or School System
○ K-12 Educational Institution or School System
○ Healthcare Organization or Facility

*Figure 8*

Express2 payinfo.asp - Page for payment information

Dell Member Information Center Checkout Step 2 Credit Card Payment Information - Microsoft Inter...

File  Edit  View  Favorites  Tools  Help

Back  Forward  Stop  Refresh  Buy@Dell

Be Direct
Dell Home | Products | Store | Support | Site Map | Search | Favorites | History | Mail | Print | Contact Buy Online or Call:
1-800-WWW-DELL ▲ Dell's Online Privacy Policy
▲ What's a Cookie?
▲ Find My Profile?
▲ Change My Password?

Dell Member Services
Express Buy Wizard
Step 1  Step 2  Step 3
* = required fields Please Choose Your Shipping Method Shipping Method [    ▼]

Please Enter Your Credit Card Data

Type: [VISA ▼]
Last Four Digits of Current Card: 1111
New Card#: (optional) [        ]
Card ID#: (Amex only) [        ]
Expiration Date: * [APR ▼] [2002 ▼]
Name as Printed on Card: * [Mike Horn]

*Express verify.asp* - User name and password login page.

Dell Member Information Center Update Profile Password - Microsoft Internet Explorer File   Edit   View   Favorites   Tools   Help Back   Forward   Stop   Refresh   Buy@Dell   Search   Favorites   History   Mail   Print Be Direct | Products | Store | Support | Site Map | Search | Contact
Dell Home Tickler Buy Online or Call:
1-800-WWW-DELL

Dell Member Services
Express Buy Wizard
Please enter your email address and password and then press Update Profile to edit your information.

Email Address: [          ]

Password: [          ]

[ Update Profile ]

[ Email Password ]

➤ Dell's Online Privacy Policy
➤ What's a Cookie?
➤ Find My Profile?
➤ Change My Password?

Powered by Dell
Powered Edge Servers

Copyright 1999 Dell Computer Corporation. All rights reserved
(Site Terms of Use)
Terms and Conditions of Sale
Online Privacy Notice
Legal Notices Microsoft Internet Explorer                                    Internet

*Figure 12*

Express Changepass.asp - Page to change your password

Dell Member Information Center Change My Password - Microsoft Internet Explorer _ □ ×

File  Edit  View  Favorites  Tools  Help

Back  Forward  Stop  Refresh  Home  Search  Favorites  History  Mail  Print  Ticker

| Be Direct | Buy@Dell | | | | | Buy Online or Call: |
| Dell Home | Products | Store | Support | Site Map | Search | Contact | 1-800-WWW-DELL |

Dell Member Services
Express Buy Wizard
Please enter your old password, desired new password, and then click "submit" to change your password.

Old Password: [          ]
New Password: [          ]
New Password:(Again) [          ]

[Submit]

➤ Dell's Online Privacy Policy
➤ What's a Cookie?
➤ Find My Profile?
➤ Change My Password?

Internet

MULTIPLE 'EXPRESS BUY' PROFILES FOR MULTIPLE STORES (DELL.COM AND GIGABUYS.COM)

BACKGROUND OF THE INVENTION

1. Field of the Invention

The present invention relates to a method and system for maintaining and retrieving one or more customer profiles for subsequent use by a plurality of server systems over the Internet.

2. Description of the Related Art

An increasing number of purchases are being conducted over the Internet. The Internet is a vast system of computers and computer networks that are interconnected through communication links. The interconnected computers exchange information, which may include information necessary to conduct purchases and other commercial activities over the Internet.

One component of the Internet is the World Wide Web ("the Web"), which is a globally connected network that includes multiple Web "pages". Web pages are collections of information that can be viewed by a user through the use of browser software. Browser software is sometimes referred to herein as "a browser". A browser is a special-purpose software application program that performs the requesting and displaying of Web pages through a communications link.

A web page can incorporate various multimedia components including text, graphics, sounds, including music and speech, animation, and video images. Web pages that include sound components can be heard as well as seen using a browser. Web pages are interconnected to one another using hypertext that allows a user to move from any Web page to another Web page, and to graphics, binary files, multimedia files, as well as any Internet resource.

The Web operates on a client/server model. The Web allows a server computer system to send graphical Web pages of information to a remote client computer system. A server computer system ("server system") includes a hardware server as well as software Web pages that make up a Web "site" as described below. The terms for the hardware "server" and the "site" are sometimes used interchangeably.

The remote client computer system can display Web pages because it includes a browser. A user runs Web client browser software such as Netscape Navigator™ or Microsoft's Internet Explorer™ on the user's computer. The browser software acts as a client that contacts a Web server and requests information or resources. The Web server locates and then sends the information to the Web browser, which displays the results to the user on the user's computer.

Web pages are defined using a markup language called Hypertext Markup Language ("HTML"). HTML provides a standard set of tags that define how a Web page is to be displayed. HTML contains commands that are sent from the server to tell the browser on the remote client computer how to display text, graphics and multimedia files. It also contains commands for linking the Web page to other Web pages and to other Internet resources.

A Web "site" is a collection of one or more Web pages. A multiple-page web site is usually organized as a tree structure of Web pages or, less often, is organized as a linear sequence of Web pages. The term "home page" is usually used to refer to the top (tree structure) or first (linear sequence) Web page of a site. A Web site can also be organized in a random structure, but even a randomly linked Web site usually has a home page from which the rest of the Web pages are linked. The home page typically acts as an introduction to the Web site, explaining its purpose and describing the information found on the other Web pages making up the Web site.

In this way, the home page acts as an index, or table of contents, for the rest of the Web site.

Each resource (i.e., computer or Web page) of the Web is located at a unique address identifier known as a Uniform Resource Locator ("URL"). Usually, the URL of the home page of a Web site is treated as the "root" address from which the URL of the remaining Web pages in a multiple-page Web site are derived. To view a specific Web page, a client computer system (such as the user's computer in conjunction with browser software) specifies the URL for that Web page in a request. The request corresponds to the HyperText Transfer Protocol ("HTTP"). The request is forwarded to the Web server that supports that Web page. When that Web server receives the request, it sends the requested Web page to the client computer system. When the client computer system receives that Web page, the user system typically displays the Web page for the user's view.

Many vendors utilize one or more Web sites to conduct electronic commerce ("e-commerce") over the Internet. Using a server system that includes a hardware server and a Web site, vendors can advertise and sell products. Each of the vendor's e-commerce sites may reside on the same hardware server, or they may reside on different servers. Using a browser, a user, who is a potential customer, can access the server systems to select items or services for purchase. Once the items or services are selected for purchase, then the server system processes purchaser-specific information regarding billing and shipping that may include a purchaser name, a purchaser ID, purchaser email address, shipping address, billing address, and purchaser credit card information such as account number and expiration date.

The server system may receive purchaser-specific information from at least three sources. A "cookie" may provide the information. The purchaser may also manually enter the information. In addition, a server system may provide an "express buy" mode wherein the server system accesses information that has been saved from one or more previous transactions with the same purchaser.

A cookie is a collection of data that is deposited on a user's computer hard drive when the user accesses a server system that is designed to deposit such information. The server system deposits the information for later retrieval. Upon a user's subsequent access to the server system (a "session"), the browser can retrieve such information for submission back to the server system, eliminating the need for the user to manually impart such information during each session with the server system.

Due to the sensitive nature of the purchaser-specific information outlined above, it is desirable to limit the amount of such information that a purchaser is required to submit during an e-commerce transaction. Similarly, it is desirable to limit the amount of time that a purchaser must spend in forwarding such information for each e-commerce purchase. When a purchaser selects items for purchase from multiple sites, re-entering shipping and billing information for each server system results in a time-consuming duplication of effort and may lead to frustration on the part of the purchaser.

One approach for limiting the time and effort required for purchasers to make subsequent purchases from an e-commerce Web site is to retain purchaser-specific information and retrieve it for correction or validation by the purchaser on subsequent purchases from the same site. In the context of electronic commerce over the Internet, customers have become accustomed to the server system retaining a profile of purchaser-specific shipping information and credit card information for each customer that has initiated a sales transaction from a particular e-commerce site. A user may invoke an "express buy" mode for subsequent purchases by indicating that he wishes for the server system to retrieve saved purchaser-specific information. This makes subsequent on-line purchases more efficient and less time-consuming. The retained customer profile information is referred to herein as an "express buy" profile.

One approach for an express buy mode is disclosed in U.S. Pat. No. 5,960,411 entitled "Method and System for Placing a Purchase Order Via a Communications Network," issued to Hartman, et al. Calling it a "one-click" approach, Hartman '411 discloses the retention and retrieval of purchaser-specific information for use in subsequent e-commerce purchases, but only discloses subsequent retrieval by the same server system that initially acquired the purchaser-specific information. This approach does not provide for sharing of purchaser-specific information among separate server systems.

A customer may wish to purchase goods or services from one or more multiple selling sites. The server system for each site must obtain pertinent customer profile information, such as the customer's name, credit card number, address, etc. A vendor that provides more than one e-commerce Web site typically requires purchasers to duplicate the effort of entering, correcting, and verifying purchaser-specific information for each Web site, regardless of whether the sites are owned by the same vendor. For instance, Dell Computer Corporation allows customers to transact purchases from its Gigabuys.com e-commerce Web site as well as from its Dell.com e-commerce Web site. However, in order to initiate purchase transactions, customers are required to enter their customer profile information upon the first transaction at each site. It would decrease the transaction time for each sale if each server system were to retain the customer profile information so that, upon the next purchase by the same customer on the same or another server system, the information could be quickly retrieved and modified, if necessary.

To further simplify and speed the sales transaction, it is desirable for multiple sales sites to have access to each of a plurality of express buy profiles for a purchaser. In addition to sharing saved user information among server systems, it is desirable to allow the same purchaser to define multiple sets of purchaser-specific information that can later be accessed by server systems. For instance, the same purchaser might wish to save one profile that uses a company credit card and maintains a workplace shipping address. The same purchaser might also wish to save another profile that uses a personal credit card and maintains a home shipping address.

SUMMARY OF THE INVENTION

One or more sets of purchaser-specific information are saved at a central location for later retrieval and use by a plurality of server systems. In a first embodiment the method of maintaining customer profile information provided by a client system includes receiving customer profile information from the client system during a first Internet session, where the information displayed on the client system is provided by one of a plurality of server systems, a server system including a hardware server and a web site. The method further includes storing the customer profile information at a unique location based upon identification information from the client system, the identification information including a user ID and an email address. The method of the first embodiment further includes processing a transaction request during a subsequent Internet session, where the client system displays information from another of the plurality of server systems during the subsequent session. The other server system includes a separate web site from that involved in the first Internet session, and the separate web site may reside on the same server or a different server than that which was involved in the first Internet session. The method of the first embodiment further includes retrieving the customer profile information using the identification information to determine the unique location in a customer data bank from which the customer profile information should be retrieved. Finally, the method further includes sending the retrieved customer profile information to the other server system.

In a second embodiment the storing of customer profile at a unique location further includes storing the customer profile information in a dictionary object on an application server, validating the customer profile information in the dictionary object, retrieving the identification information from the client system, and determining a unique location for storing the customer profile information, based upon the identification information, instantiating a user object associated with the unique location, retrieving the customer information from the dictionary object into the user object, and invoking one or more functions associated with the user object to retrieve the customer information from the user object into the unique location in a customer data bank.

In a third embodiment, the retrieving of the customer profile information by using the identification information also includes retrieving the identification information from the client system and determining a unique location for storing the customer profile, the unique location being based on the identification information. A user object associated with the unique location is instantiated, and the customer profile information is retrieved from the unique location within the customer data bank into the user object.

In one embodiment, the transaction request is a confirm order request. In another embodiment, the transaction request is an update profile request. In another embodiment, the client system includes a cookie file that maintains the identification information. In another embodiment, the identification includes a user ID and an email address.

Another embodiment maintains a plurality of customer profile information for the same client system at the unique location in the customer data bank. A first and subsequent customer profile information are received and stored at the unique location in the customer data bank. When a transaction request is processed, a customer profile is selected from among the first and subsequent customer profile information that have been stored at the unique location. The transaction request may be an update profile request or a confirm order request.

In another embodiment, display information is presented to a customer on the screen. During a current Internet session, a presentation is displayed on the computer screen, the presentation prompting the customer to select an express buy profile option. A presentation is then displayed on the computer screen prompting the customer to select an express buy profile that has been previously saved in a customer data bank during a previous Internet session.

An embodiment for a system that maintains customer profile information includes a client system having a microprocessor coupled to memory and to a browser, a plurality of server systems, and a storage and retrieval system. The storage and retrieval system is configured to store one or more express buy profiles that have been received from the client system, where the saved express buy profiles can be accessed and retrieved by any and all of the plurality of server systems.

PREFERRED EMBODIMENTS OF THE DRAWINGS

The present invention may be better understood, and its numerous objects, features, and advantages made apparent to those skilled in the art by referencing the accompanying drawings.

FIG. 6 is an example of a screen presentation that prompts a customer for a transaction request.

FIG. 7 is an example of a screen presentation that prompts a customer for shipment information.

FIG. 8 is an example of a screen presentation that prompts a customer for billing information.

FIG. 9 is an example of a screen presentation that prompts a customer for credit card information.

FIGS. 10A and 10B are examples of screen presentations that prompting a customer for password information.

FIG. 12 is an example of a screen presentation that prompts a customer to enter an "update profile" transaction request.

FIG. 13 is an example of a screen presentation that prompts a customer to enter new password information.

FIG. 15 is an example of a screen presentation that prompts a customer for a profile name.

The use of the same reference symbols in different drawings indicates similar or identical items.

DESCRIPTION OF THE PREFERRED EMBODIMENT(S)

The present invention provides a single source that maintains multiple sets of customer profile information that may be used and shared among multiple server systems. The customer may then make later purchases more efficiently because any one of a plurality of server systems ay use the saved "express buy" customer profile information to process a subsequent purchase, rather than requiring the customer to re-enter customer profile information for each purchase.

Figure 1:
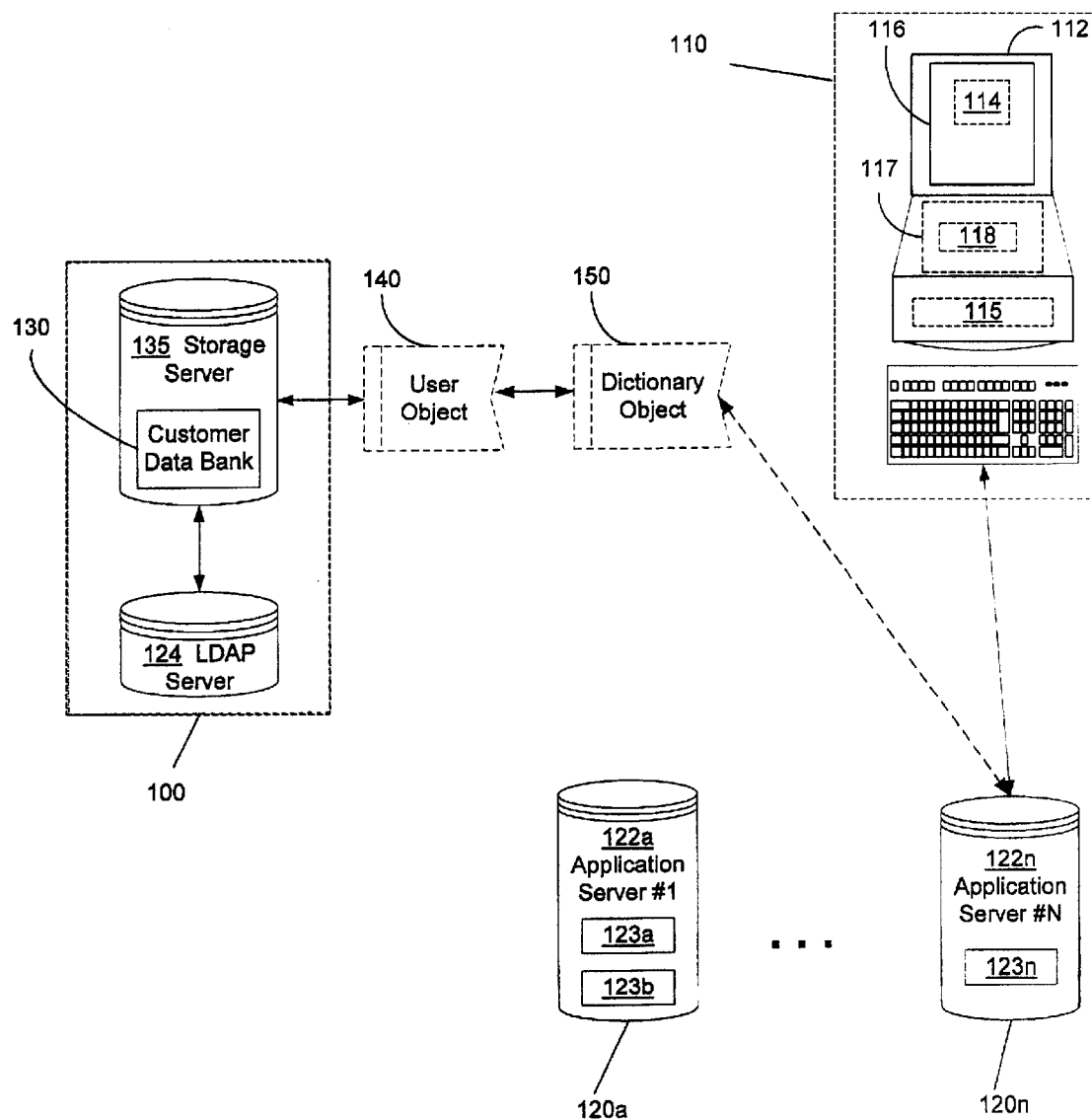
FIG. 1 is a block diagram of one embodiment of a system that maintains multiple express buy profiles for use by a plurality of server systems.

FIG. 1 illustrates one embodiment of a storage and retrieval system 100 that maintains multiple express buy profiles for use by a plurality of server systems. The storage and retrieval system 100 utilizes information provided via a client system 110 that is operated by a potential customer. The client system 110 includes a computer system 112 and browser software 114. The computer system 112 may be found in many forms including, for example, mainframes, minicomputers, workstations, servers, personal computers, Internet terminals, notebooks and embedded systems. Personal computer (PC) systems, such as those compatible with the x86 configuration, include desktop, floor standing, or portable versions. A typical PC computer system 112 is a microcomputer that includes a microprocessor (or simply "processor") 115 coupled to associated memory 117 and also coupled to control logic and a number of peripheral devices that provide input and output for the system 112. The memory 117 typically includes a hard drive (not pictured). Most commercially available browsers 114 provide for and manage a cookie file 118 that resides in memory 117 on the hard drive of the PC computer system 112. Information retrieved by the browser 114 is displayed to the customer via a screen 116, which is one of the peripheral devices.

The storage and retrieval system 100 communicates with one or more server systems 120a–120n. Each server system 120a–120n includes an application server 122a–122n. In addition to the application servers 122a–122n, the server systems 120a–120n include web pages that are installed upon the application servers 122a–122n. These pages may be organized into a plurality of web sites 123a–123n. Each server system 120 therefore includes a physical application server 122 and a web site 123 that resides on the server 122. The same application server 122 may be included in more than one server system 120, since more than one web site 123 may reside on a single application server 122.

The storage and retrieval system 100 may reside on one or more of the application servers 122a–122n or on one or more other servers. FIG. 1 illustrates an embodiment in which the storage and retrieval system 100 resides on a storage server 135 and an LDAP server 124, storage server 135 and LDAP server 124 being physically distinct from the application servers 122a122n. The storage server 135 and LDAP server 124 are discussed in further detail below. The storage and retrieval system 100 includes a customer data bank 130 in which express buy customer profile information is stored for access by the plurality of server systems 120a–120n. In at least one embodiment, the customer data bank 130 is organized as a directory. Other embodiments may organize the customer data bank 130 in any other known information storage and retrieval format, such as a hierarchical database or a relational database.

At least one embodiment organizes and stores the customer profile information in a directory format according to the Personalization and Membership format provided with Microsoft's Site Server 3.0 ™. The preferred embodiment uses the Lightweight Directory Access Protocol (LDAP) to manage the storage and retrieval of saved express buy profiles in the customer data bank 130. In at least one embodiment, the software that executes the LDAP resides on a physically distinct server 124 from the storage server 135 that the customer data bank 130 resides on. Accordingly, the customer data bank 130 resides on a storage server 135 that is physically distinct from the separate server 124 that executes LDAP. The storage server 135 executes SQL Server 6.5™ software. One skilled in the art will recognize that such a configuration is not necessary to practice the system, and that the logical and physical configuration of the elements of the storage and retrieval system 100 may take on numerous permutations according to various considerations including cost, space requirements, and resource availability.

The storage and retrieval system 100 maps the stored express buy profile information in the customer data bank 130 to the correct client system 110 through the use of identification information. Using this identification information, the storage and retrieval system 100 stores the customer profile information at a unique location associated with the particular client system 110. The identification information includes a user ID. In one embodiment, the server system 120 assigns a unique user ID to the client system 110. Unless the customer has disabled the ability of the browser to do so, the browser 114 stores the user ID in a cookie file 118 included in the client system. In at least one embodiment, the cookie file 118 and its stored user ID's reside on the hard drive (not pictured) of the client system 110 and may be retrieved from the cookie file 118 by the server system 120. Using the user ID and an email address that the customer provides as described below, the storage and retrieval system 100 maps each user ID to a customer that may use the client system 110 to place an order.

Figure 2B:
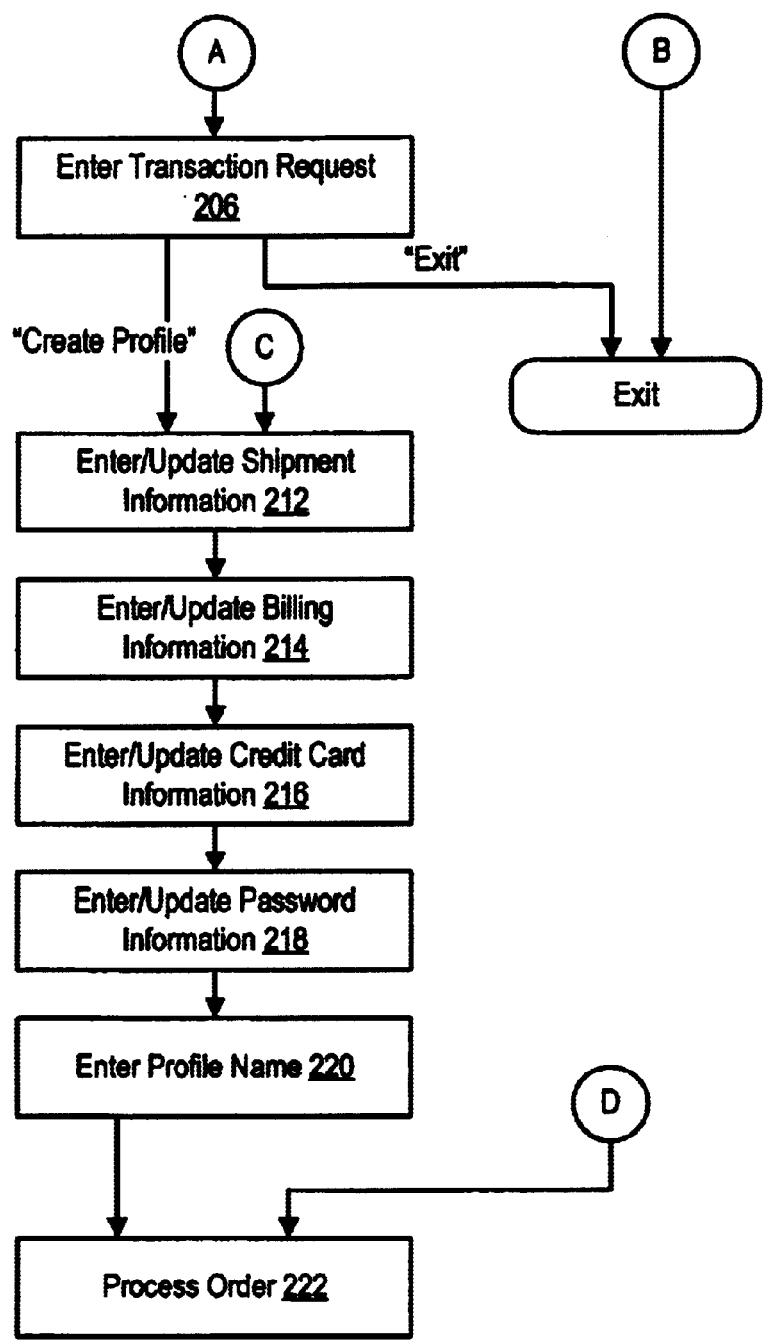
FIG. 2 is a flow diagram illustrating a sequence of actions through which a customer provides express buy profile information to a server system.

FIGS. 2A and 2B are flow diagrams illustrating a sequence of actions through which a customer provides express buy profile information for use by one or more server systems. One skilled in the art will realize that the sequence of steps provided in FIGS. 2A and 2B need not necessarily be followed in the order presented but, rather, may be followed in any logical order. When choosing to make a purchase on an e-commerce site, the customer must indicate in action 202 whether the customer desires to pursue the "express buy" option rather than re-enter all customer profile information. If this session is the first session in which the customer has elected to make an "express buy" purchase from any of the plurality of server systems, then the customer will be led through a "wizard" that prompts the customer for purchaser-specific information which will be stored for later retrieval from any of the plurality of server systems. If the customer already has a cookie and at least one saved express buy profile, then the customer has already traversed the wizard at least once.

Figure 5:
FIG. 5 is an example of a screen presentation that prompts a selection of the express buy option.

FIGS. 1, 2 and 5 illustrate that, in at least one embodiment, the server system 120 displays information to the customer prompting a selection of the express buy option. FIG. 5 shows an example of a screen presentation that prompts a selection of the express buy option. If the customer selects the express buy option in action 202, then the server system 120 determines in decision 204 whether a cookie 118 and at least one previously-saved express buy profile exist for the client system 110 that the customer is using. If both a cookie 118 and a saved profile are not found, then the customer enters a transaction request in action 206.

FIG. 6 shows an example of a screen presentation that prompts the customer for a transaction request that will be entered by the user in action 206. FIG. 6 illustrates that the customer may choose to exit the express buy process (by selecting the "Your Cart" option) or the customer may, instead, proceed to enter customer profile information in actions 212 through 218 by selecting the "Create Profile" option.

FIGS. 2A and 2B illustrate that if the customer enters an exit transaction request in action 206, then the customer exits the process of providing express buy profile information. If, instead, the customer enters a "Create Profile" transaction request in action 206, then the customer enters customer profile information in actions 212 through 218. The customer profile information entered in actions 212 through 218 include email address, shipping address information, billing address information, credit card information, and password information. The email address is stored along with the user ID in the cookie 118. The email address is also forwarded, along with the other customer profile information, to the server system 120 (FIG. 1).

Figure 10A:
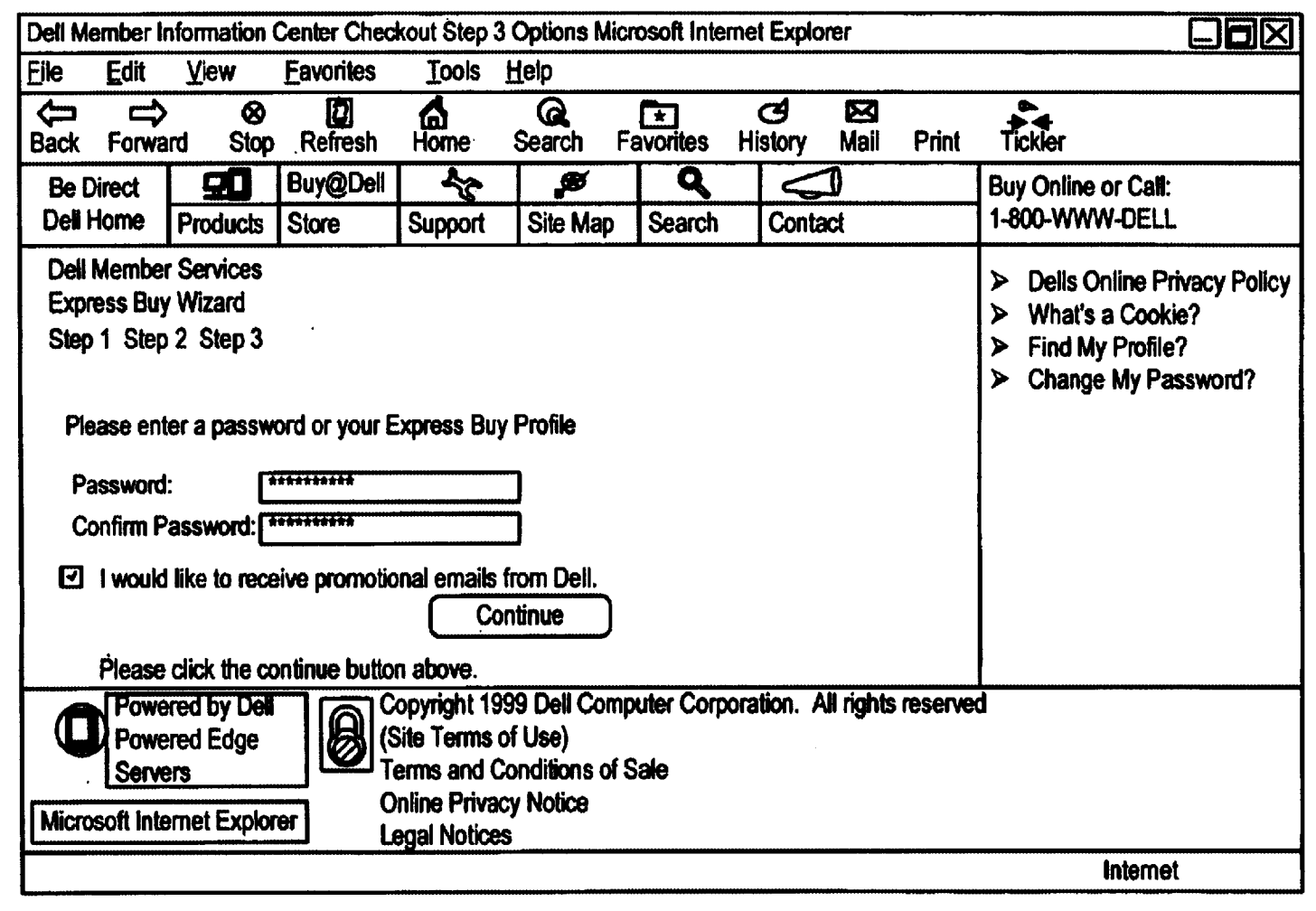
Figure 10B:
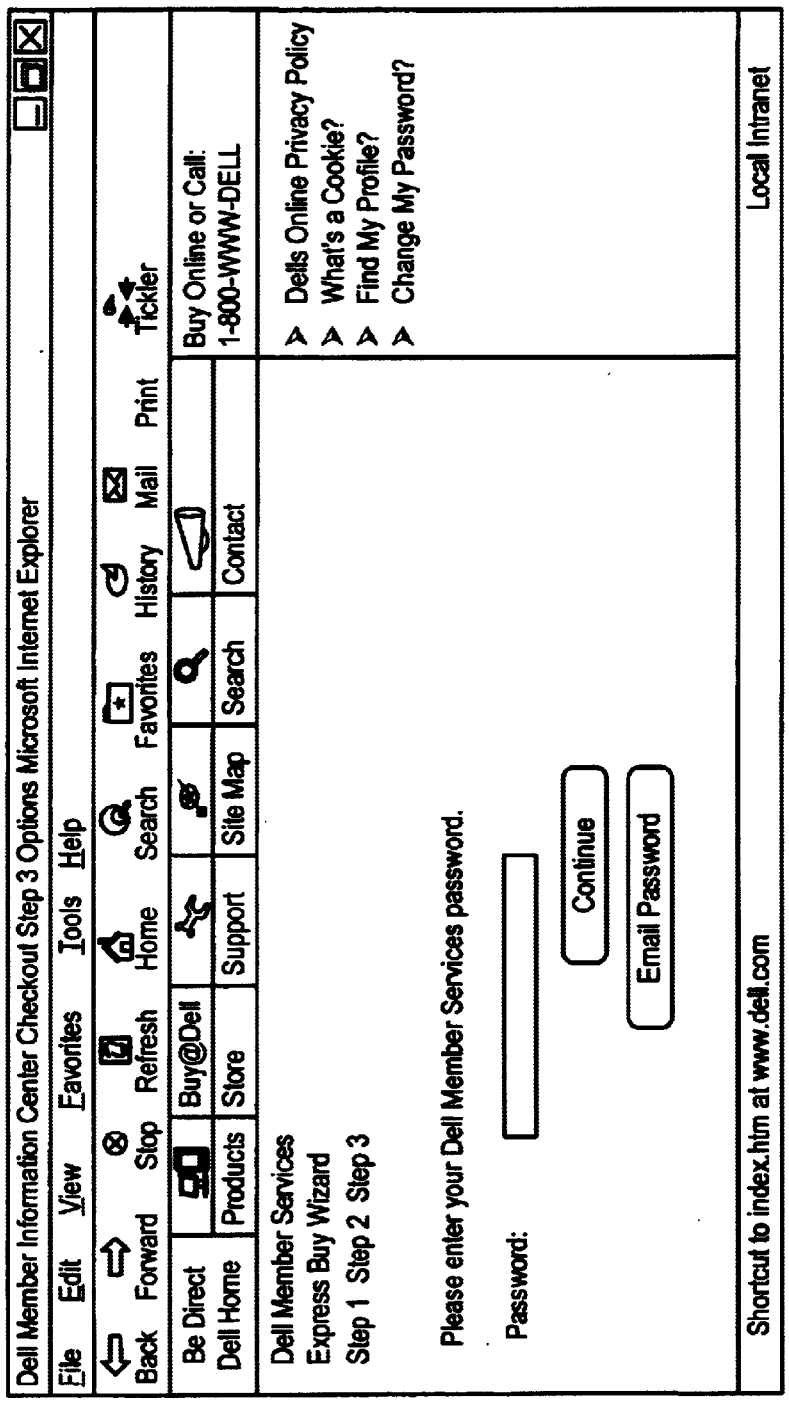

FIGS. 2 and 7 through 10 show examples of screen presentations that prompt the customer for express buy customer profile information in actions 212 through 218 (FIG. 2). FIG. 7 shows a screen presentation that prompts a customer for shipment information to be entered by the customer in action 212. FIG. 8 shows a screen presentation that prompts a customer for billing information to be entered by the customer in action 214. FIG. 9 shows a screen presentation that prompts a customer for credit card information to be entered by the customer in action 216. FIG. 10 shows a screen presentation that prompts a customer for password information to be entered by the customer in action 216. FIG. 10A shows a screen presentation prompting password information when the customer does not have an existing password for the server system 120. FIG. 10B shows a screen presentation prompting password information when a customer does already have an existing password for the server system 120.

Figure 11:
FIG. 11 is an example of a screen presentation that prompts a customer to either select an existing profile or choose to create a new profile.

FIGS. 2A and 11 illustrate that the user proceeds to action 208 if it is determined in decision 204 that both a cookie and at least one previously-saved express buy profile exist for the client system 110 that the customer is using. In prompting the customer for action 208, the server system 120 reads the cookie 118 and then retrieves from the customer data bank 130 every stored express buy profile associated with the customer's client system 110 as identified by the identification information in the cookie 118. When the one or more profiles are retrieved, they are displayed to the customer to view. FIG. 11 show an example of a screen presentation that prompts the customer to either select an existing profile or choose to create a new profile. The customer then chooses in action 208 a profile that the customer wishes to use for the purchase transaction or wished to modify for use with the purchase transaction. The customer may alternatively decide in action 208 create a new profile. If the customer chose in action 208 to create a new profile, then the customer performs actions 212 through 218 to enter customer profile information as discussed above.

Figure 14:
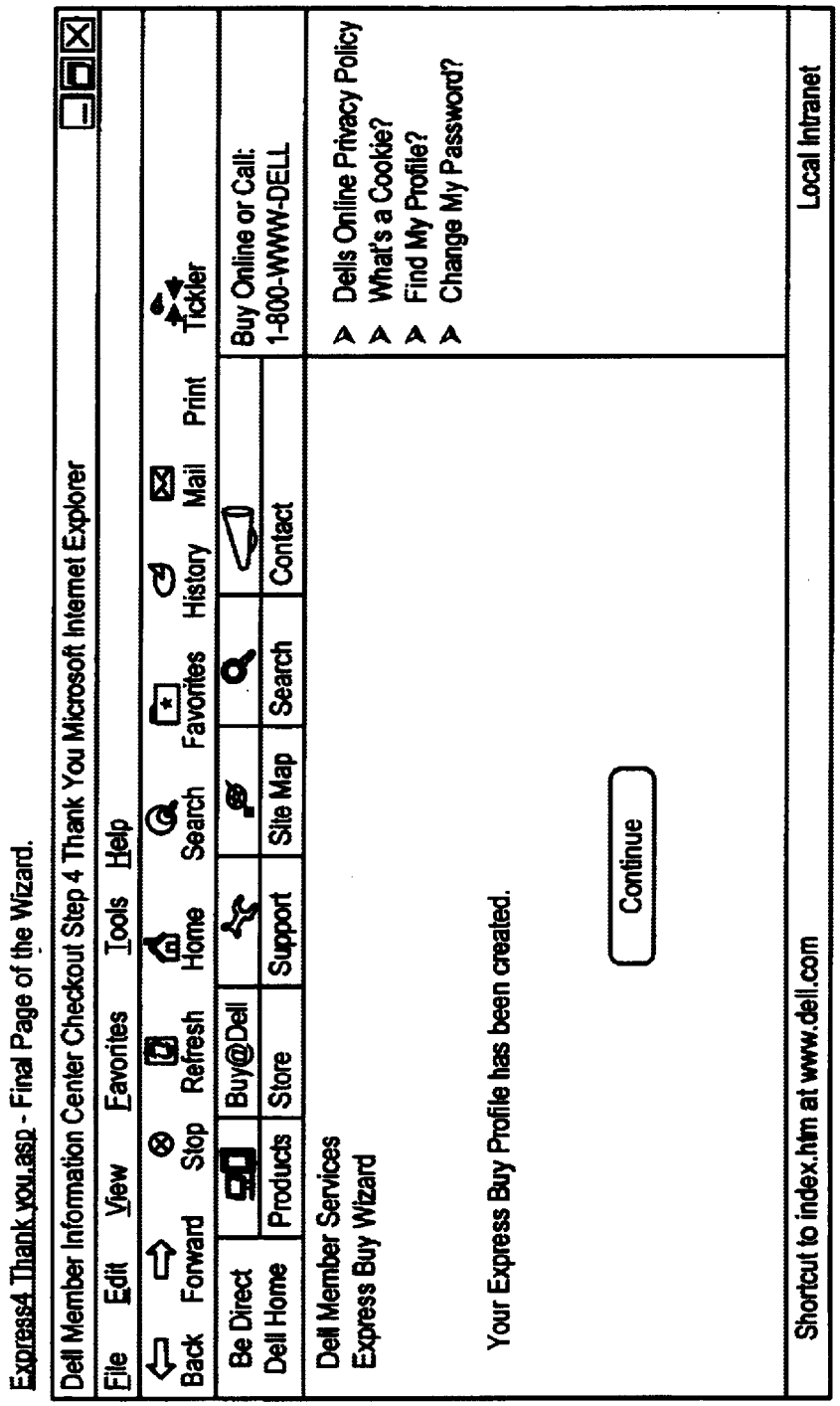
FIG. 14 is an example of a screen presentation of a termination message displayed to a customer when the express buy sequence is exited.

FIGS. 2A, 12, 13, and 14 illustrate further processing that occurs when a customer has chosen an existing profile. FIG. 2A illustrates that, upon determining that the customer has chosen an existing profile in action 208, the server system 120 then prompts the customer to enter a transaction request in action 210. The transaction request may be an exit request, an "update profile" request, a "confirm order" request, a "change password" request, or an "exit" request, among others. For example, FIG. 12 shows an example of a screen presentation that prompts the customer to enter an "update profile" transaction request. If the customer enters an "update profile" transaction request in action 210, then the customer completes actions 212 through 218 to update all or some of the customer profile information associated with the selected profile. If, instead, the customer enters a "confirm order" request, then the selected profile information is displayed for the customer as a confirmation step (not depicted) and the server system then processes the customer's order in action 222. If the customer enters instead a "change password" request in action 210, then the user enters new password information in step 224. FIG. 13 shows an example of a screen presentation that prompts the customer to enter new password information in action 224. If the customer enters an exit request in action 210, then the express buy sequence is exited. FIG. 14 shows an example of a screen presentation of a termination message displayed to the customer when the express buy sequence is exited. One skilled in the art will recognize that an exit request may accompany any or all of the actions depicted in FIG. 2, and need not necessarily be limited to actions 206 and 210 as depicted in FIG. 2A.

Figure 15:
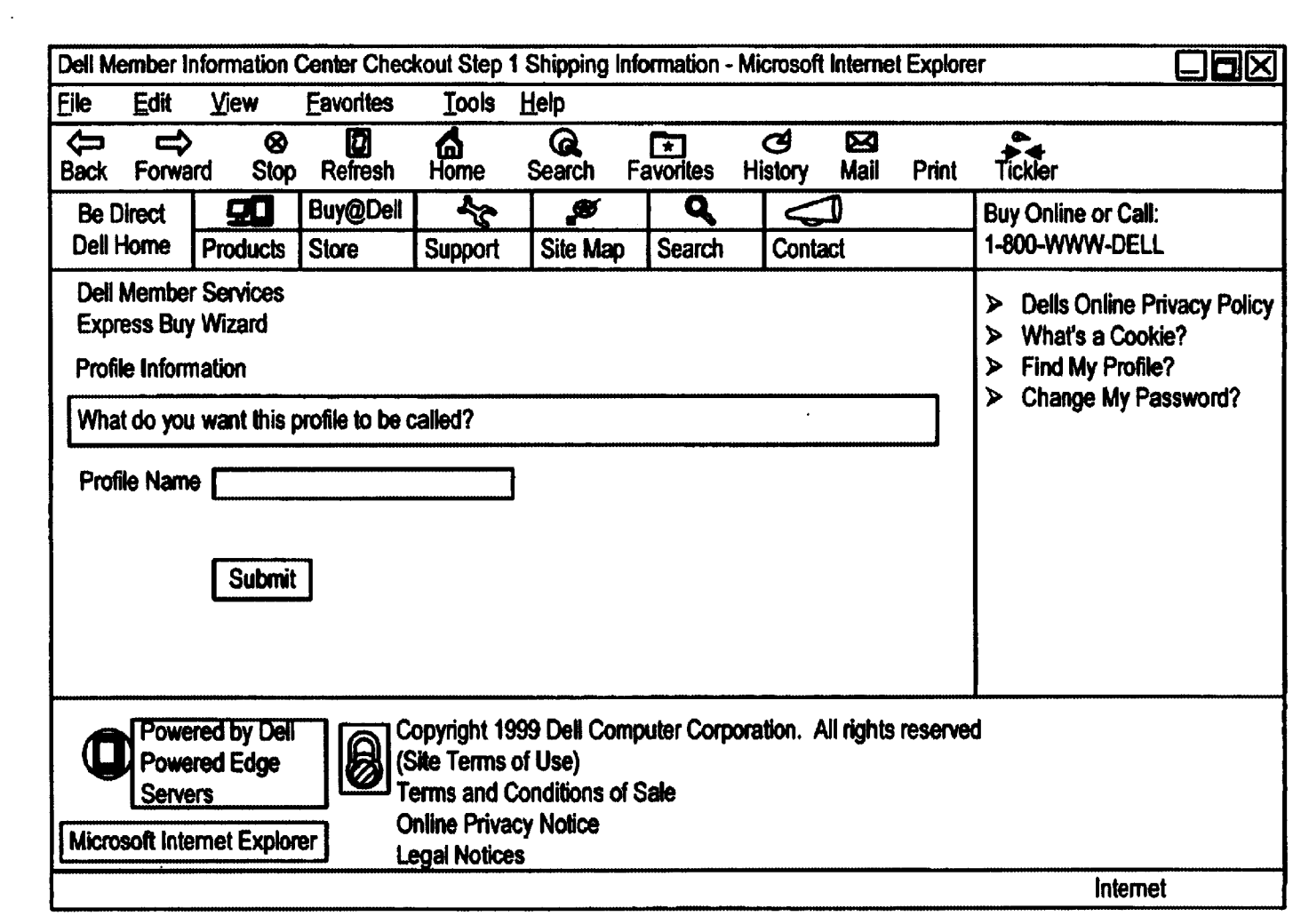

FIG. 2B illustrates that, if a user has executed a sequence of actions leading to completion of 218, then the user will next execute action 220. In action 220, the user provides a unique profile name for a new profile that has been created through the execution of actions 212 through 218. If an existing profile has been updated by the user in actions 212 through 218, then the profile name of the existing profile will be displayed, and the user may either confirm the existing profile name or designate a new name for the updated profile. FIG. 15 shows an example of a screen presentation prompting the customer for a profile name.

In action 222, the server system 120 and the storage and retrieval system 100 work in conjunction with each other to process the customer's order. This processing includes at least two components, those two components being a storage component and a retrieval component, each of which are discussed separately below.

Figure 3:
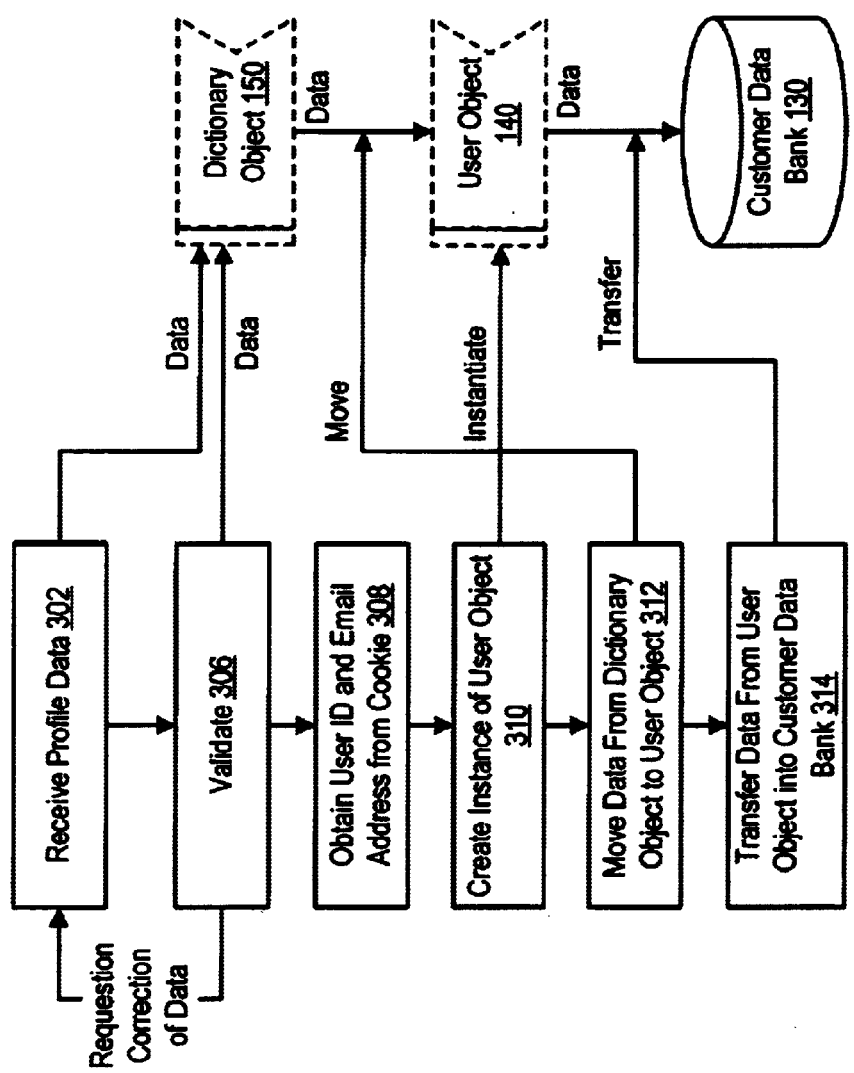
FIG. 3 is a flow diagram illustrating the storing of express buy profile information for use by a plurality of server systems.

FIG. 3, which is relevant to a discussion of the storage component, is a flow diagram illustrating the actions taken to store express buy profile information for use by a plurality of server systems. The customer profile information entered by the customer in steps 221 through 220 (FIG. 2) are received in action 302 and are temporarily stored by the server system 120 in a dictionary object 150. The customer profile information in the dictionary object 150 is validated in action 306 and if an error is found, the customer is prompted to provide correct information. After validation and correction (if necessary) has been completed, the server system performs action 308.

In action 308, the server system 120 obtains the client's system's user ID and email address from the cookie 118 of the client system 110. The server system 120 uses a mapping algorithm to determine a unique location in the customer data bank 130 for storing the customer profile information so that the customer profile information is associated with the client system 110. The server system then instantiates, in action 310 a user object 140 that is associated with the unique location. In at least one embodiment, the user object 140 is a Visual Basic Component Object Model (COM) that supports LDAP.

In action 312 the server system 120 retrieves the customer profile information from the dictionary object 304 and stores the customer profile information in the user object 140. In at least one embodiment the customer profile information is retrieved field by field from the dictionary object 150 and stored in the user object 140.

Once the customer profile information has been stored in the user object 140, the server system 120 invokes functions included in the user object 140. In at least one embodiment, the functions are invoked from Visual Basic script code stored on the application server 122. In action 314 the server system 120 and storage and retrieval system 100 work together, using the user object functions, to store the customer profile information at the unique location in the customer data bank 130. The user object functions help move the information from the user object to the customer data bank 130. For example, one of the functions included in the user object 140 is a "PutAttribute" function. The PutAttribute function is invoked by VB script code on a Web page included in the server system 120. For example, the VB script code 'user.put ("first_name","John Doe")' invokes the user object 140 PutAttribute function, which moves the first name information "John Doe", according to the LDAP protocol, into the first-name field at the appropriate location in the customer data bank 130.

FIGS. 1 and 2 are relevant to a discussion of the retrieval of customer profile information. After an initial session where the customer profile information is created or modified and then stored in the customer data bank 130, as described above in connection with FIG. 3, the customer profile information may be retrieved during a subsequent session. The subsequent session may be with the same application server 122 and Web site 123 as were involved in the original storage. In the alternative, the subsequent session during which retrieval is performed may be conducted by a different Web site 123 on the same or a different application server 122. During the subsequent session, the customer enters a transaction request. FIG. 2 illustrates several types of transactions that a customer may request in a subsequent session after at least one express buy profile has been stored. Action 210 of FIG. 2 illustrates that a customer may make the following types of transaction requests: confirm order, update profile, change password, or exit. One skilled in the art will recognize that this listing of transaction requests is not exhaustive, and the transaction requests may include other requests relevant to an e-commerce transaction, such as returning to a shopping cart page, searching for a particular profile, and contacting customer service.

Figure 4:
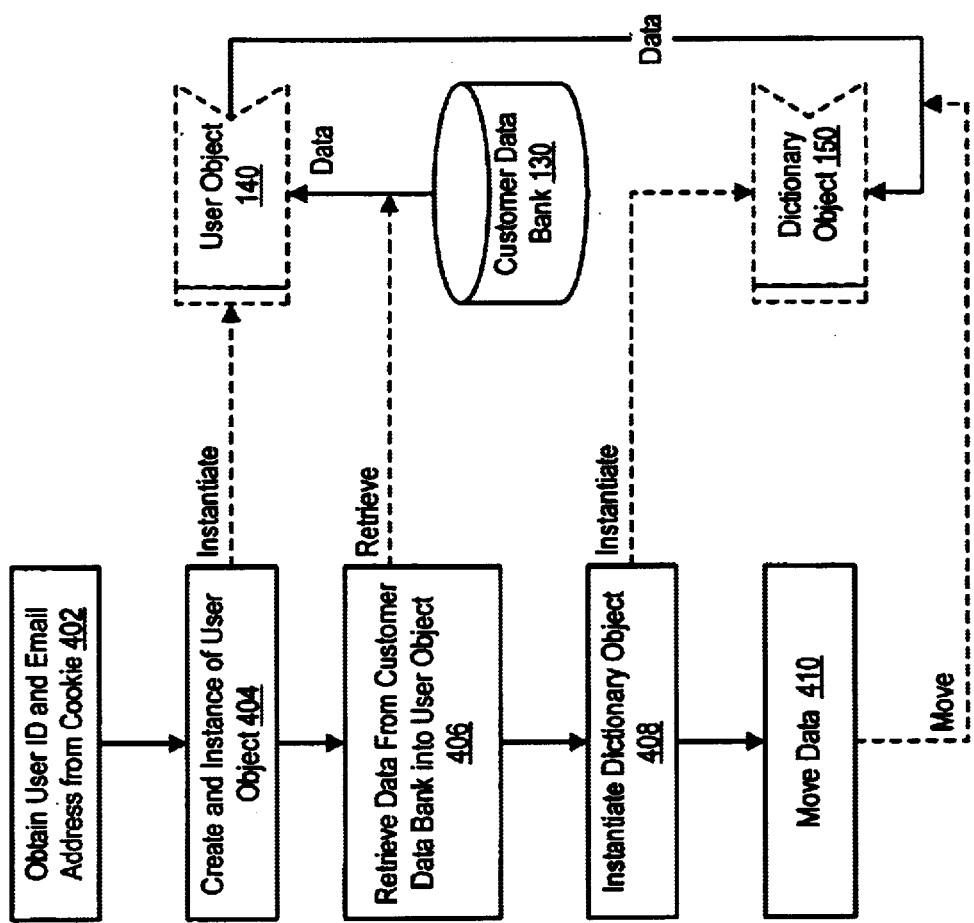
FIG. 4 is a flow diagram illustrating the retrieval of express buy profile information for use by one of a plurality of server systems.

FIG. 4 illustrates the retrieval component of the storage and retrieval system 100. FIG. 4 illustrates that, when retrieval of stored express buy profile information initiated, a server system 120 obtains the user ID and email address (the identification information) from the cookie 118 on the client system 110. The identification is used to determine the location of saved express buy customer profile information pertaining the client system 110 in the customer data bank 130. This determination is made by the server system 120, which uses a mapping algorithm to determine the unique location in the customer data bank 130 where the customer profile information associated with the client system 110 is stored. The mapping algorithm keys the unique location to the customer's user ID and email address, so that multiple profiles for the same user ID and email address are all stored at various positions within the same unique location. The server system then instantiates, in action 404 a user object 140 that is associated with the unique location. In at least one embodiment, the user object 140 is a Visual Basic Component Object Model (COM) that supports LDAP, and is instantiated by Visual Basic script code that resides on the application server 122.

In action 406, the server system 120 and storage and retrieval system 100 work together to retrieve customer profile information from the customer data bank 130 and store it in the user object 140. Customer profile information may be retrieved by a different server system 120 than the one involved in storage of the customer profile information. For instance, customer profile information stored by a server system including application server 122*a* and Web site 124*a* could later be retrieved by a server system including application server 122a and Web site 123b or could be retrieved by a server system including application server 122n and Web site 123n. That is, customer profile information may be stored in the customer data bank 130 by any one of a plurality of server systems 120a–120n and may later be retrieved by any other of the plurality of server systems.

In action 406, Visual Basic code that resides on the application server 122 executes Visual Basic script code that invokes functions associated with the user object 140 that was instantiated in action 404. These functions make live database hits to the customer data bank 130 to retrieve data from the customer data bank 130 and place it into the user object. For instance, a Visual Basic script statement of 'first_name=usr.get ("first_name")' would, continuing from the example above, retrieve "John Doe" and place it in the first name field of the user object. For a customer that has stored multiple express buy profiles in the data bank 130, all of the information is stored as one profile at one unique location on the customer data bank storage server 135. Each field of the profile stored in the customer data bank 130 is capable of holding a multivalued array of information. Therefore, in the example above, each first name stored in the express buy profile would be retrieved from the data bank 130 and stored in multiple array locations of the first name field of the user object. After the information from the user object 140 is retrieved by the server system 120, a dictionary object 150 is instantiated in action 408. The dictionary object 150 is resident on the server system 12. In action 410, the profile information from the user object 140 is moved to the dictionary object 150. From the dictionary object 150, the server system 120 may manipulate the data in the express buy profile without causing the live database hits to the customer data bank 130 that manipulation of data in a user object 140 would generate. After the dictionary object 240 is instantiated in action 408 and the information from the user object 140 is transferred to the dictionary object 150 in action 410, the user object 140 is destroyed (not shown).

In the manner described above, each customer may retain multiple express buy profiles. For instance, a customer may wish to save a profile for information pertinent to purchases made for home use, and a second profile for purchases made on behalf of an employer. In each case, there is likely to be different shipping and billing information, although the customer is the same for both express buy profiles. The saved sets of customer profile information are stored in a central customer data bank that is accessible to a plurality of server systems.

We claim:

1. A method for maintaining customer profile information provided by a client system, the client system displaying information to a customer profile of a plurality of server systems, each server system including a respective physical application server and web site, and receiving the customer profile information from the customer, the client system including a browser and also including identification information identifying the client system, the method comprising:

receiving from the client system the customer profile information during a first session, the client system displaying information from one of the plurality of server systems during the first session;

storing the customer profile information at a unique location based upon the identification information, the storing the customer profile at a unique location based upon the identification information including storing the customer profile information in a dictionary object on an application server, validating the customer profile information in the dictionary object;

retrieving the identification information from the client system;

determining a unique location for storing the customer profile information, based upon the identification information;

instantiating a user object associated with the unique location, wherein the user object includes one or more associated functions;

retrieving the customer information from the dictionary object into the user object; and, invoking one or more of the associated functions to retrieve the customer information from the user object into the unique location, the unique location being included in a customer data bank;

processing a transaction request during a subsequent session, the transaction request including at least one of a confirm order request and an update profile request, the client system displaying information from another one of the plurality of server systems during the subsequent session;

retrieving the customer profile information using the identification information, the retrieving the customer profile information using the identification information including retrieving the identification information from the client system;

determining a unique location for storing the customer profile information, based upon the identification information;

instantiating a user object associated with the unique location, the user object including one or more associated functions; and, invoking one or more of the associated functions to retrieve the customer information from the unique location into the user object; and sending the customer profile information to the another one of the plurality of server systems.

2. The method of claim 1 wherein client system includes a cookie file that includes the identification information.

3. The method of claim 1 wherein the identification information includes a user ID and an email address.

4. A system for maintaining customer profile information provided by a client system, the client system displaying information to a customer from one of a plurality of server systems, each server system including a respective physical application server and web site, and receiving the customer profile information from the customer, the client system including a browser and also including identification information identifying the client system, the system comprising:

means for receiving from the client system the customer profile information during a first session, the client system displaying information from one of the plurality of server systems during the first session;

means for storing the customer profile information at a unique location based upon the identification information, the means for storing the customer profile at a unique location based upon the identification information including means for storing the customer profile information in a dictionary object on an application server, means for validating the customer profile information in the dictionary object;

means for retrieving the identification information from the client system;

means for determining a unique location for storing the customer profile information, based upon the identification information;

means for instantiating a user object associated with the unique location, wherein the user object includes one or more associated functions;

means for retrieving the customer information from the dictionary object into the user object; and, means for invoking one or more of the associated functions to retrieve the customer information from the user object into the unique location, the unique location being included in a customer data bank;

means for processing a transaction request during a subsequent session, the transaction request including at least one of a confirm order request and an update profile request, the client system displaying information from another one of the plurality of server systems during the subsequent session;

means for retrieving the customer profile information using the identification information, the means for retrieving the customer profile information using the identification information including means for retrieving the identification information from the client system;

means for determining a unique location for storing the customer profile information, based upon the identification information;

means for instantiating a user object associated with the unique location, the user object including one or more associated functions; and, means for invoking one or more of the associated functions to retrieve the means for sending customer information from the unique location into the user object; and means for sending the customer profile information to the another one of the plurality of server systems.

5. The system of claim 4 wherein client system includes a cookie file that includes the identification information.

6. The system of claim 4 wherein the identification information includes a user ID and an email address.

* * * * *